US009868362B2

(12) United States Patent
Zocco

(10) Patent No.: US 9,868,362 B2
(45) Date of Patent: Jan. 16, 2018

(54) TRANSPORT DEVICE FOR TRANSPORTING OBJECTS IN A CIRCULATING MANNER

(71) Applicant: MACHINES HIGHEST MECHATRONIC GMBH, Erl (AT)

(72) Inventor: Carmelo Zocco, Saronno (IT)

(73) Assignee: Machines Highest Mechatronic GMBH, Erl (AT)

( * ) Notice: Subject to any disclaimer, the term of this patent is extended or adjusted under 35 U.S.C. 154(b) by 325 days.

(21) Appl. No.: 14/417,535

(22) PCT Filed: Jul. 24, 2013

(86) PCT No.: PCT/EP2013/065658
§ 371 (c)(1),
(2) Date: Jan. 26, 2015

(87) PCT Pub. No.: WO2014/016356
PCT Pub. Date: Jan. 30, 2014

(65) Prior Publication Data
US 2015/0191104 A1 Jul. 9, 2015

(30) Foreign Application Priority Data

Jul. 27, 2012 (DE) .................... 20 2012 007 288 U

(51) Int. Cl.
*B60L 15/00* (2006.01)
*B41J 3/407* (2006.01)
(Continued)

(52) U.S. Cl.
CPC ............ *B60L 15/005* (2013.01); *B41J 3/4078* (2013.01); *B61B 13/04* (2013.01); *B65G 35/06* (2013.01); *H02K 7/20* (2013.01)

(58) Field of Classification Search
CPC ......... B60L 15/00; B60L 15/005; H02K 7/20; B61B 13/04; B65G 35/06; B41J 3/4078
See application file for complete search history.

(56) References Cited

U.S. PATENT DOCUMENTS 3,246,609 A 4/1966 Westfall
4,458,185 A * 7/1984 Matty .................... B60L 15/24
318/270
(Continued)

FOREIGN PATENT DOCUMENTS

CN 1333549 8/2007
CN 10 1736659 A 6/2010
(Continued)

OTHER PUBLICATIONS

International Preliminary Report on Patentability dated Jan. 27, 2015, issued in PCT Application No. PCT/EP2013/065658, filed Jul. 24, 2013.
(Continued)

*Primary Examiner* — Zachary L Kuhfuss
(74) *Attorney, Agent, or Firm* — Workman Nydegger

(57) ABSTRACT

Transport apparatus for circumferentially transporting objects (22) along a circumferential transport lane (10), in particular, for a printing machine, having—at least one transport slide (20), to which an object (22) is mountable, and at least two processing units (15, 16) for processing an object, which are arranged along the transport lane (10), wherein each transport slide (20) comprises an individual drive (25) for moving the respective transport slide (20) along the transport lane (10), wherein each individual drive (25) includes a stepper motor (25) for moving the respective transport slide (20) along the transport lane (10) and for positioning the transport slide (20) at one of the processing units (15, 16), and that a central control unit (40) is present that is configured, for moving the transport slide (20) and for positioning the transport slide (20) at one of the processing units (15, 16), to output a digital positioning instruction for the stepper motors (25).

8 Claims, 1 Drawing Sheet

(51) Int. Cl.
   *B65G 35/06*   (2006.01)
   *B61B 13/04*   (2006.01)
   *H02K 7/20*    (2006.01)

(56) References Cited

U.S. PATENT DOCUMENTS

| | | | |
|---|---|---|---|
| 4,800,818 A | | 1/1989 | Kawaguchi et al. |
| 4,947,978 A | | 8/1990 | Rhodes |
| 5,094,337 A | * | 3/1992 | van Veldhuisen ..... B65G 47/52 198/357 |
| 6,883,911 B2 | * | 4/2005 | Niimi ..................... B41J 3/4078 101/126 |
| 2005/0192701 A1 | * | 9/2005 | Ben-Ezra ................. B07C 5/36 700/213 |

FOREIGN PATENT DOCUMENTS

| | | |
|---|---|---|
| DE | 102008032151 A1 | 1/2010 |
| WO | 97/09258 | 3/1997 |

OTHER PUBLICATIONS

International Search Report dated Nov. 4, 2013, issued in PCT Application No. PCT/EP2013/065658, filed Jul. 24, 2013.

\* cited by examiner

TRANSPORT DEVICE FOR TRANSPORTING OBJECTS IN A CIRCULATING MANNER

BACKGROUND OF THE INVENTION

1. Field of the Invention

The present description relates to a transport apparatus for transporting objects along a circumferential transport lane, in particular, for a printing machine, according to the preamble of claim 1.

2. Present State of the Art

A transport apparatus according to this type comprises at least one transport slide, to which an object is mountable, and at least two processing units for processing an object, which are arranged at the transport lane, wherein each transport slide comprises an individual drive for moving the respective transport slide along the transport lane.

Such transport apparatuses are used in various industry branches, for example, in processing, manufacturing, or assembling objects and, in particular, when treating surfaces, such as printing on objects. The processing units at the transport lane are designed in accordance with these tasks.

For driving the transport slide, different techniques are known. Accordingly, a central drive mechanism may be present for all transport slides, which, for example, moves a belt running along the transport lane, by means of which the transport slides are pulled. Here, however, the flexibility of moving transport slides independently of each other or of extending the transport lane is limited. Such a transport apparatus is described in DE 27 60 217 C2.

Further, it is known to alternatively make use of linear motors, in which a guiding rod along the transport lane forms the stator of the linear drive. Here, however, there is also little flexibility, for example, with regard to changes of the circumferential transport lane, because of the specific design of the guiding lane.

In a transport apparatus according to the generic type, as it is described in U.S. Pat. No. 3,246,609, each transport slide has its own individual drive. Although, by means of the individual drives, the transport slides can be controlled flexibly and independently of each other; however, in U.S. Pat. No. 3,246,609, for stopping the individual drives, stop mechanisms specifically adapted thereto are required at the processing units. Only by means thereof, sufficiently precise positioning of the transport slide at a processing unit is achieved. Thereby, the flexible use of different transport slides is limited.

SUMMARY OF THE INVENTION

It can be regarded as an object of the invention to provide a transport apparatus that allows high flexibility using low-cost means.

This object is solved by the transport apparatus having the features of the claim 1.

Advantageous variants of the transport apparatus according to the invention are subject of the dependent claims and are moreover described in the following description, in particular, in connection with the FIGURE.

In the transport apparatus of the aforementioned type, according to the invention, it is provided that each individual drive comprises a stepper motor for moving the respective transport slide along the transport lane and for positioning the transport slide at one of the processing units, and that a central control unit is present that is configured to output a digital positioning instruction for the stepper motors for moving the transport slides and for positioning the transport slide at one of the processing units.

Because each transport slide is capable of assuming a specific position on the basis of the positioning instruction autonomously and independently of other transport slides, it can be said that each individual drive has its an own intelligence.

It can be considered a basic principle of the invention to use such individual drives that not only are suitable for moving the transport slides between the processing units, that is, over comparably long distances. Rather, precise positioning of the transport slides at a processing unit shall be enabled by means of the drive. Hereto, according to the invention, stepper motors are used, which provide a higher precision compared to conventional electric motors or servo motors.

This provides a higher flexibility compared to conventional transport apparatuses, in which either complex stop mechanisms for stopping an individual drive in front of a processing unit or a second motor is necessary that is used not for moving from one processing unit to the next, but for positioning at a processing unit. Because of the use and the specific control of the stepper motors according to the invention, however, such a second motor that moves the transport slide or an object mounting thereof in the same direction as the stepper motor is not absolutely necessary. However, an adjustment unit may be provided at the transport slide that allows a fine alignment of the object in a horizontal plane.

According to a further core idea of the invention, a central control unit is configured not only for moving the transport slide, but also for positioning the transport slide at the processing units. This is achieved by outputting digital positioning instructions for the stepper motor whereby the higher precision of stepper motors compared to conventional motors can advantageously be used.

The circumferential transport lane may, for example, be formed using one or multiple tracks running in parallel. The transport slides can comprise one or multiple drive wheels that are driven by the individual drive and may contact a track of the transport lane. The individual drive with the stepper motor may be connected to the main body of the transport slide, at which the object is held, in a jointed manner. Thereby, the transport slide is particularly suited also for trips on curved transport lanes.

A transport slide can furthermore comprise guiding wheels or guiding rolls with which the transport slide is guided along the tracks of the transport lane. The guiding wheels or rolls may be arranged at a carriage vehicle unit, which is connected to the main body of the transport slide in a jointed manner. In order to prevent slippage, means for adjusting the pressure of the drive wheel against the guiding track may additionally be present.

The object to be processed principally may be of an arbitrary type and comprise, for example, blanks, work pieces, textiles and garments. In a preferred embodiment of the transport apparatus according to the invention, at least one of the processing units is a printing unit for printing on an object that is fixed to a transport slide.

In the invention, a stepper motor is used for moving the entire transport slide. Accordingly, by means of the stepper motor, an object mounting on the transport slide is not moved with regard to the transport slide.

So that a basically arbitrary number of transport slides can be controlled by the central control unit, it is provided in a preferred embodiment that each transport slide comprises an identification number, that the central control unit is configured to output positioning instructions together with identification numbers, and that each transport slide comprises drive control means that are configured to control the stepper motor, when a positioning instruction with an identification number is received that matches the identification number of the transport slide, by a step number that corresponds to the positioning instruction.

Thereby, the central control unit can be configured to transmit the positioning instructions as step number commands. Alternatively or additionally, the drive control means may be configured to determine a step number in dependence of a positioning instruction and in dependence of a current position of the respective transport slide and to control the respective stepper motor by means of a step number command corresponding to the determined step number. While conventional control units oftentimes merely output a start time and an end time for an activation of an individual drive, a positioning instruction with a significantly higher precision can be transmitted by means of a step number command of the central control unit according to the invention.

If the drive control means of the respective transport slide themselves derive a step number command from the positioning instruction of the central control unit, then the positioning instruction can be output independently of the stepper motor specifically used. It is also possible that different transport slides use stepper motors having different step lengths. Thereby, advantageously, a particularly high flexibility can be achieved. It is preferred that, for positioning a transport slide at one of the processing units, a minimal step length, by which the respective transport slide can be moved, is smaller than 4 cm, preferably smaller than 1 cm. By means of the minimal step length, the precision is determined with which the transport slide can be positioned.

In a preferred embodiment of the transport apparatus according to the invention, a sliding contact track, which runs along the transport lane, is provided for communication between the central control unit and the drive control means of the respective stepper motors. This way, a communication with the central control unit can be guaranteed independently of the position of a transport slide at the transport lane. Although, in principle, a radio transmission is possible; however, because of the numerous different radio transmission standards, a higher flexibility can be achieved by means of the sliding contact track for the reason that differently designed drive control means are capable of communicating with the central control unit.

The sliding contact preferably allows the guiding of a transport slide along the transport lane. For this purpose, a transport slide additionally comprises a guiding wheel or a guiding roll, which contacts the sliding contact track. Expediently, an energy track can be provided for supplying energy to the transport slides, which supplies an electrical potential of a remote energy source and runs along the transport lane. Preferably, the sliding contact track and the energy track are formed by a common track. Hereby, the electric contacts of a transport slide for contacting the sliding contact track and the energy track can be arranged in close vicinity to each other. These electrical contacts typically being sensitive, a single protective housing for protecting the electrical contacts of the transport slide may be sufficient due to this close arrangement. Particularly for this purpose, the sliding contact track and the energy track are preferably formed by electrical lines of a common track running in parallel to each other.

In order to further improve the precise positioning enabled by the stepper motors, it is provided in an embodiment that the one or the multiple transport slides comprise respective position monitoring means for determining a position of the respective transport slide with regard to one of the processing units and/or to the transport lane, and that the drive control means are configured to correct the step number command in dependence of the determined position. By means thereof, slippage, lock-up of a wheel of the transport slide, or an incorrect positioning can be detected and corrected. Such position monitoring means can also be referred to as path encoder or encoder. By means of the correction, the step number command can be set to a specific step number or changed by a specific amount so that a remote processing unit is precisely reached. The drive control means may be configured to correct the step number command without stopping the transport slide. Compared to conventional position monitoring control units, this way, an undesirable halt can be avoided.

In another variant of the transport apparatus according to the invention, the one or the multiple transport slides comprise respective communication means that are configured to transmit the position of the respective transport slide determined using the position monitoring means via the sliding contact track. Here, the central control unit may be configured to generate a positioning instruction to a transport slide in dependence of a transmitted position of another transport slide. Hereby, a control is provided in a particularly simple way that prevents a collision of two transport slides. It can also be provided that the central control unit outputs a corrected positioning instruction on the basis of the position determined using the positioning monitoring means, which depends on the determined position and a desired position of the transport slide.

In the following, further features and advantages of the invention are described in connection with the included FIGURE.

DETAILED DESCRIPTION OF THE PREFERRED EMBODIMENTS

Figure 1:
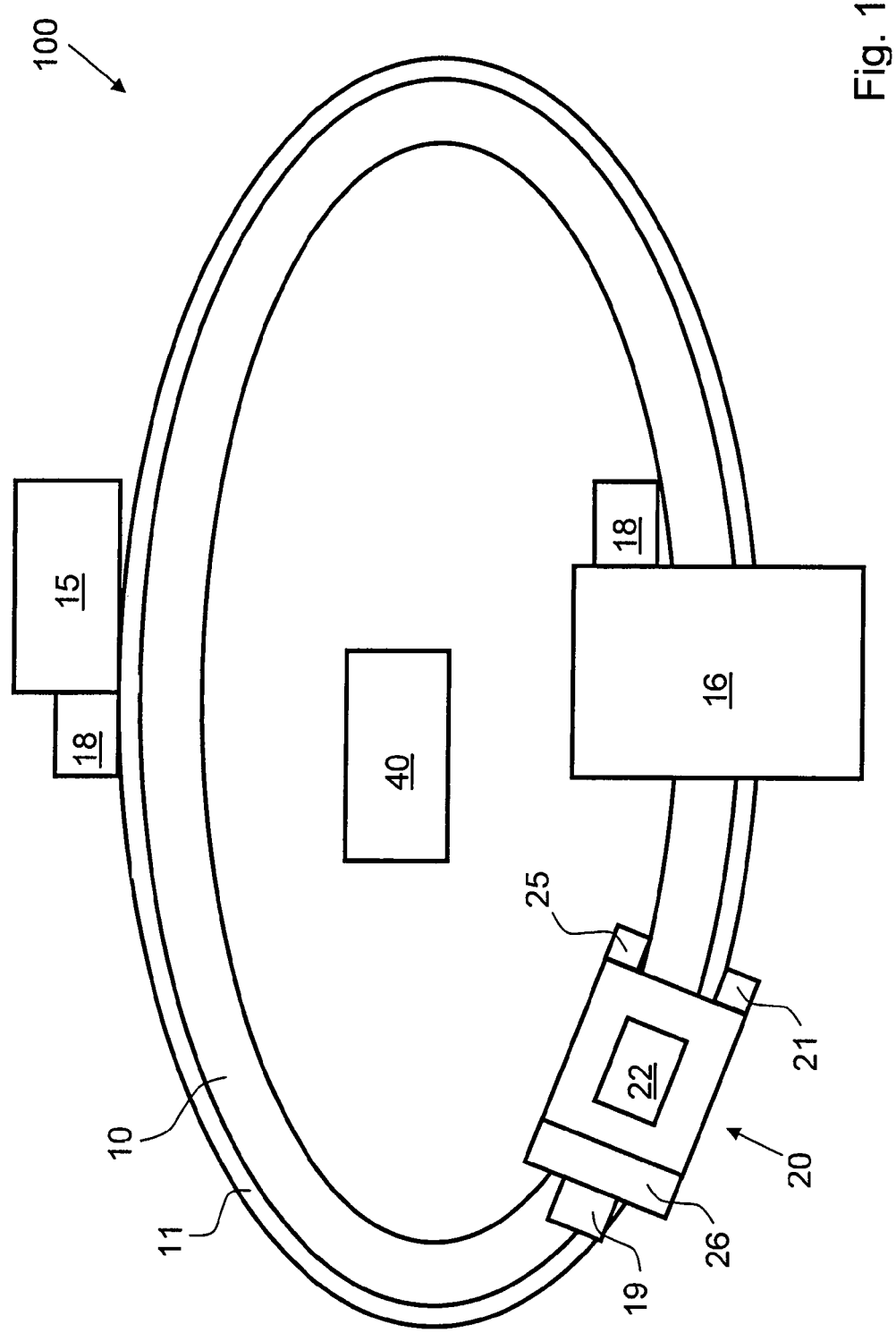
FIG. 1: a schematic illustration of an embodiment of a transport apparatus according to the invention.

In FIG. 1, a preferred embodiment of a transport apparatus 100 is shown.

As essential components, the transport apparatus 100 comprises a circumferential, that is, closed-path, transport lane 10, at least one transport slide 20, process units 15 and 16, and a central control unit 40 for controlling the transport slide 20. An arbitrary number of further transport slides and process units can additionally be present.

By means of the process units 15 and 16, an object 22, which is carried by the transport slide 20, can be processed, for example, printed on, cut, or wrapped.

According to the invention, each transport slide 20 comprises an individual drive 25 with a stepper motor 25. By means thereof, different transport slides can be positioned flexibly and precisely. Due to the high positioning precision of stepper motors, the central control unit 40 is enabled not only to command a movement of transport slides between the two processing units 15 and 16 with a digital positioning instruction, but also to effect a positioning of a transport slide at the processing unit 15 or 16. Thereby, the precision of the positioning may be determined by a minimal step length, by which the stepper motor 25 can move the corresponding transport slide 20. A comparable precision is possible with conventional electric motors only with a disproportionately large effort.

Via a not-shown adjustment unit at the transport slide 20, a fine alignment of the object 22 can be performed at a resolution that is better than the minimal step length of the stepper motor 25.

For controlling the stepper motor 25, the transport slide 20 comprises drive control means 26 that control the stepper motor 25 by a step number to be moved.

This step number is based on a positioning instruction of the central control unit 40. For the communication between the central control unit 40 and the transport slide 20, a sliding contact track 11 is arranged along the transport lane 10. Besides electric lines for data communication, this can also comprise electric lines for supplying energy to the stepper motor 25 of a transport slide 20.

The transport slide 20 further comprises communication means 21. For receiving a positioning instruction, these contact the sliding contact track 11. Preferably, they are also configured for transmitting data to the central control unit 40 via the sliding contact track 11. The data sent by the communication means 21 may correspond to a current position of the transport slide 20. Thereupon, the central control unit 40 can correct a positioning instruction to the transport slide 20 in dependence of the transmitted position and/or output a positioning instruction to another transport slide. Thereby, for example, a collision of two transport slides can be avoided. Alternatively or additionally, the data transmitted by the communication means 21 may include an identification number of the transport slide 20. Using the identification number, the central control unit 40 can control different transport slides separately from each other.

The central control unit 40 can also be configured to recognize an erroneous assignment of identification numbers. When two transport slides have the same identification number and send it together with their current position to the central control unit 40, then this may perform a plausibility check in dependence of the transmitted position whether one and the same transport slide 20 could have been at these two positions or whether there must be two different transport slides with the same identification number.

In order to increase the positioning precision, position marker 18 and position monitoring means 19 may be present. Thereby, the transport slide 20 can be equipped with position monitoring means 19, and position marker 18 can be arranged at the processing means 15 and 16. Alternatively, each transport slide 20 can be provided with a position marker 18, and position monitoring means 19 are arranged at processing means 15 and 16. An arrangement of the position monitoring means 19 at transport slide 20 is preferred when the transport slide 20 itself comprises drive control means 26 that can determine or correct a step number command in dependence of the determined position. In addition, the flexibility is hereby insofar increased as transport slides of different dimensions can be used that themselves determine a step number to move in dependence of a detectable position marker 18. An arrangement of the position monitoring means 19 at the processing units 15 and 16 can, on the other hand, be preferred when the central control unit 40 is configured to output a positioning instruction to a transport slide 20 in dependence of its determined position. Additionally, hereby, the costs of an individual transport slide 20 are smaller which leads to cost savings when a large number of transport slides are used.

In both cases, a step number for the stepper motor 25 is determined using the position monitoring means 19, by means of which a more precise positioning compared to conventional electric motors or servo motors is enabled. This advantage is of particular importance if, when a position marker 18 is detected, a transport slide 20 is to additionally move a specific distance. By using the stepper motor according to the invention, this distance can be moved with particularly high precision.

Even independent of the position monitoring means 19, a more precise positioning at the processing unit 15 and 16 compared to the prior art can be achieved by means of the stepper motor 25 in that the central control unit 40 transmits not only a mere instruction for moving the transport slide 20 between the processing units 15 and 16. Rather, it transmits a digital positioning instruction, by means of which an exact positioning of the transport slide 20 at a processing unit 15, 16 is also performed. Thereby, an exact positioning of the transport slides 20 can easily be performed when the transport lane 10 is extended or further processing units are added, as a result of which the transport apparatus 100 according to the invention offers particularly high flexibility.

The invention claimed is:

1. A transport apparatus configured for circumferentially transporting textiles along a circumferential transport lane of a printing machine, comprising:
   a plurality of transport slides, each configured to support a textile to be printed, and
   at least two processing units for processing textiles, at least one of said at least two processing units being a printing unit;
   wherein said at least two processing units are arranged along the circumferential transport lane, wherein each transport slide comprises an individual drive configured for moving the respective transport slide along the circumferential transport lane,
   wherein each individual drive comprises a stepper motor configured for moving the respective transport slide along the circumferential transport lane and for positioning the transport slide at least at said printing unit,
   the transport apparatus further comprising a central control unit configured for moving the transport slides and for positioning the transport slides at least at said printing unit,
   said central control unit being configured to output a digital positioning instruction for the stepper motors,
   wherein each transport slide comprises an identification number,
   the central control unit being configured to output positioning instructions together with identification numbers,
   each transport slide comprising drive control means that are configured to control the stepper motor, when a positioning instruction with an identification number is received that matches the identification number of the transport slide, by a step number that corresponds to the positioning instruction.

2. The transport apparatus according to claim 1, wherein the central control unit transmits a positioning instruction as a step number command, and/or that drive control means are configured to determine a step number in dependence of a positioning instruction and in dependence of a current position of the respective transport slide and to control the respective stepper motor by means of a step number command corresponding to the determined step number.

3. The transport apparatus according to claim 1, wherein for positioning a transport slide at one of the processing units, a minimal step length, by which the transport slide can be moved, is smaller than 4 cm.

4. The transport apparatus according to claim 1, further comprising a sliding contact track, which runs along the circumferential transport lane for communication between the central control unit and the drive control means of the respective stepper motors.

5. The transport apparatus according to claim 4, further comprising an energy track for supplying energy to the transport slides, wherein said energy track supplies an electrical potential of a remote energy source and runs along the circumferential transport lane, the sliding contact track and the energy track being formed by electrical lines of a common track running in parallel to each other.

6. The transport apparatus according to claim 1, wherein one or more of said transport slides comprise respective position monitoring means for determining a position of the respective transport slide with regard to one of the processing units and/or to the circumferential transport lane, the drive control means being configured to correct a step number command in dependence of a position determined by said respective position monitoring means.

7. The transport apparatus according to claim 6, wherein one or more of said transport slides comprise respective communication means that are configured to transmit the position of the respective transport slide determined using the position monitoring means via the sliding contact track, the central control unit being configured to generate a positioning instruction to a transport slide in dependence of a transmitted position of another transport slide.

8. An apparatus comprising:
a plurality of transport slides, each configured to support a textile to be printed;
a closed-path transport lane;
at least two processing units for processing textiles, at least one of said at least two processing units being a printing unit,
wherein said at least two processing units are arranged along the closed-path transport lane,
wherein each transport slide comprises an individual drive configured for moving the respective transport slide along the closed-path transport lane,
wherein each individual drive comprises a stepper motor configured for moving the respective transport slide along the closed-path transport lane and for positioning the transport slide at least at said printing unit, said transport slide being configured to support said textile while said textile is printed by said printing unit,
the apparatus further comprising a central control unit configured for moving the transport slide and for positioning the transport slide at least at said printing unit, said central control unit being configured to output a digital positioning instruction for the stepper motors
wherein each transport slide comprises an identification number,
the central control unit being configured to output positioning instructions together with identification numbers,
each transport slide comprising drive control means that are configured to control the stepper motor, when a positioning instruction with an identification number is received that matches the identification number of the transport slide, by a step number that corresponds to the positioning instruction.

* * * * *